United States Patent [19]

Meador

[11] 4,019,126
[45] Apr. 19, 1977

[54] DIPMETER MEANS UTILIZING GENERATED EDDY CURRENTS AND LINES OF FLUX IN AN EARTH FORMATION

[75] Inventor: Richard A. Meador, Houston, Tex.

[73] Assignee: Texaco Inc., New York, N.Y.

[22] Filed: Apr. 10, 1974

[21] Appl. No.: 459,742

[52] U.S. Cl. .................................................. 324/5
[51] Int. Cl.² ...................... G01V 3/08; G01V 3/18
[58] Field of Search ............................ 324/1, 5, 6, 8

[56] References Cited

UNITED STATES PATENTS

| | | | |
|---|---|---|---|
| 2,167,630 | 8/1939 | Bazzoni et al. | 324/5 |
| 3,068,400 | 12/1962 | Castel et al. | 324/1 |
| 3,187,252 | 6/1965 | Hungerford | 324/6 |
| 3,388,323 | 6/1968 | Stripling | 324/8 |
| 3,510,757 | 5/1970 | Huston | 324/6 |
| 3,609,521 | 9/1971 | Desbrandes | 324/6 |

*Primary Examiner*—Gerard R. Strecker
*Attorney, Agent, or Firm*—Thomas H. Whaley; Carl G. Ries; Ronald G. Gillespie

[57] ABSTRACT

A dipmeter in a well logging tool includes conventional type circuitry which senses the angle of inclination of the logging tool and an azimuth angle. The dipmeter also includes a non-conventional type bed detection sub-system. The bed detection sub-system includes at least three radio frequency oscillators having their coils mounted on pads of the logging tool. As the logging tool moves through the borehole, the electrical current passing through the coils on the pads causes lines of flux to circulate through the earth formation. Eddy currents are developed for each group of fluxlines created by a coil. As the earth formation changes, the eddy current changes accordingly causing a grid current in the oscillator to change. Portion of the grid currents are transmitted uphole and are recorded so that the interface between the types of earth's formation may be recorded with its relationship to the particular borehole and thus used to determine the dip of different earth formation beds.

1 Claim, 4 Drawing Figures

DIPMETER MEANS UTILIZING GENERATED EDDY CURRENTS AND LINES OF FLUX IN AN EARTH FORMATION

BACKGROUND OF THE INVENTION

1. Field of the Invention

The system of the present invention relates to meters in general and, more particularly, to dipmeters.

2. Description of the Prior Art

Standard three or four arm dipmeters are not used effectively to invert mud type drill holes. These dipmeters use electrodes to inject and detect the current flow in the formation near each dipmeter pad. Since oil and air are insulators, no electric current can reach the formation of interest. This results in a practically useless dipmeter survey.

The dipmeter of the present invention provides apparatus and method for making dipmeter measurements which overcome the operational problems in making dipmeter surveys in oil or air drilled holes.

U.S. Pat. No. 3,388,323 issued to A. A. Stripling appears to be similar in construction. However, the concept of operation differs. The Stripling patent requires that coils 91, 92 and 93 have high permeability cores. Coils having high permeability cores are extremely temperature sensitive and pressure sensitive. Temperature and pressure changes within a borehole represent a major problem. Further, Stripling investigates the magnetic properties of the medium and as such they must operate at low frequencies below a few kilohertz. Stripling measures magnetic susceptibility and conductivity whereas the apparatus of the present invention measures resistivity and dielectric constant.

SUMMARY OF THE INVENTION

A dipmeter includes the logging tool adapted to be passed through a borehole traversing an earth formation. The logging tool includes a sensor sensing the angle of inclination of the borehole. The inclination sensor provides an inclination angle signal corresponding to the sensed angle of inclination. Another sensor senses the azimuth angle of the logging tool within the borehole and provides a corresponding azimuth signal. At least three circuits generate eddy currents in the earth's formation as the logging tool passes through the borehole. The circuits are arranged in a predetermined spatial relationship to each other. Each circuit provides a signal corresponding to said eddy currents being generated by that circuit.

A recorder located on the surface adjacent to the borehole records the angle signals and signals from the circuits so that a determination may be used as to interfaces between different types of earth formation.

The object and advantages of the invention will appear hereinafter from a consideration of the detailed description which follows, taken together with the accompanying drawings, wherein one embodiment of the invention is illustrated by way of example. It is to be expressly understood, however, that the drawings are for illustration purposes only, and are not to be construed as defining the limits of the invention.

DESCRIPTION OF THE INVENTION

Figure 1:
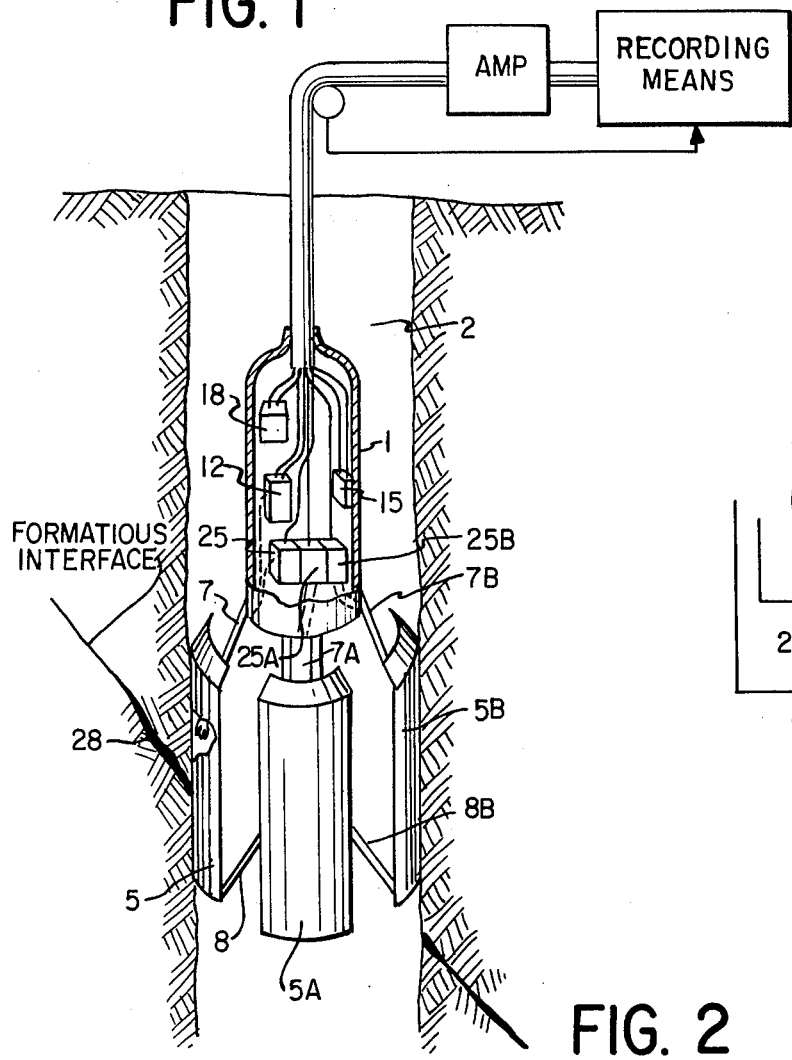
FIG. 1 is a partial pictorial representation and a partial simplified block diagram of a dipmeter constructed in accordance with the present invention.

FIG. 1 shows a logging tool 1, in a borehole 2 traversing earth formations, having three pads 5, 5A and 5B attached to it by arms 7 and 8, 7A and 8A and 7B and 8B, respectively. Logging tool 1 contains a conventional type dipmeter logging system with the exception of the bed detection sub-system. The conventional portion includes means 12 which may be of a conventional type, mechanically connected to arm 7 for providing a signal $E_1$ corresponding to the diameter of borehole 2.

The conventional portion also includes conventional type means 15 for providing an inclination of the borehole and means 18, which may be of a conventional type, for providing an azimuth signal corresponding to an azimuth angle of logging tool 1 relative to magnetic north.

The improved bed detection sub-system includes oscillators 25, 25A and 25B which cooperate with coils 28, 28A and 28B, respectively, to detect a change in the type of earth formation. Coils 28, 28A and 28B are mounted on pads 5, 5A and 5B, respectively. Coils 28A and 28B are not shown. Oscillator 25 is shown in detail in FIG. 2 and includes a 6DS4 nuvistor vacuum tube 30, but any vacuum tube having good radio frequency characteristics may be used.

Figure 2:
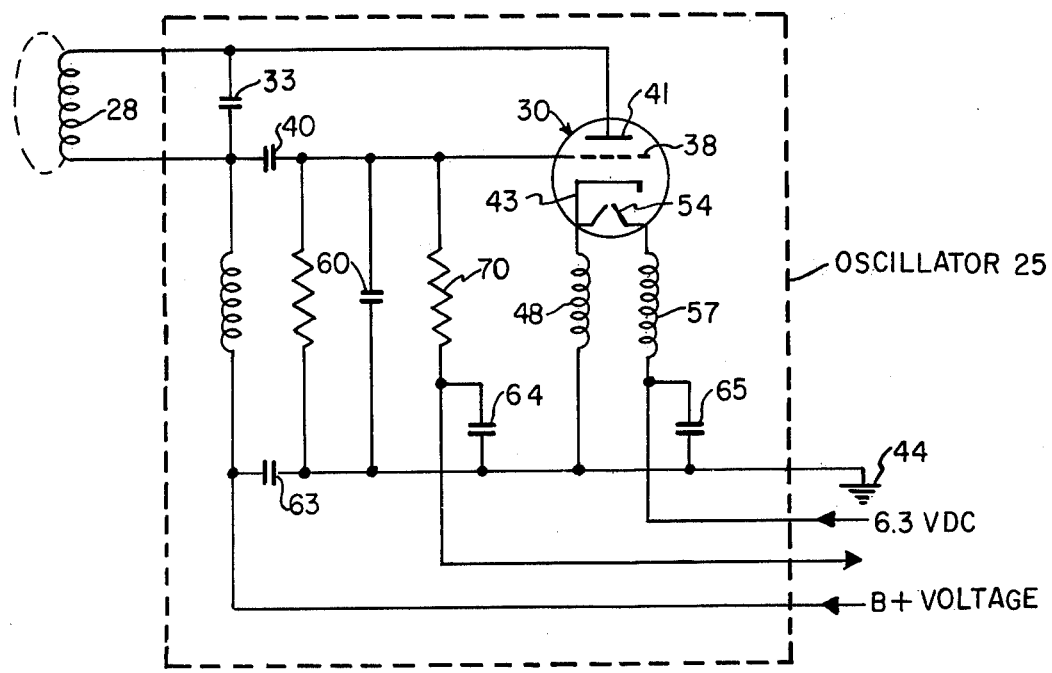
FIG. 2 is a schematic diagram of an oscillator shown in FIG. 1.

Referring to FIG. 2, coil 28 and a capacitor 33 form a tank circuit for oscillator 25, coil 28 may be constructed using two turns of ⅛ inch diameter copper wire, each turn being approximately ¾ inch by ⅝ inch. Capacitor 33 may have a value of 10 picofarads.

A grid 38 of tube 30 is connected to one connection of coil 28 and capacitor 33 by way of another capacitor 40 which functions as part of a plate-to-grid feedback circuit along with coil 28 and capacitor 33. A plate 41 of tube 30 is connected to the other connection of coil 28 and capacitor 33. A cathode 43 of tube 30 is connected to a ground 44 through a radio frequency choke 48 and to a filament 54 of tube 30. The other end of filament 54 receives a 6.3 volt positive direct current voltage through another radio frequency choke 57.

A capacitor 60 cooperates with coil 28, capacitors 33, 40 to establish the oscillations. Capacitor 60 may have a value of 10 picofarads. Capacitors 63, 64 and 65 are filtering capacitors.

Figure 3:
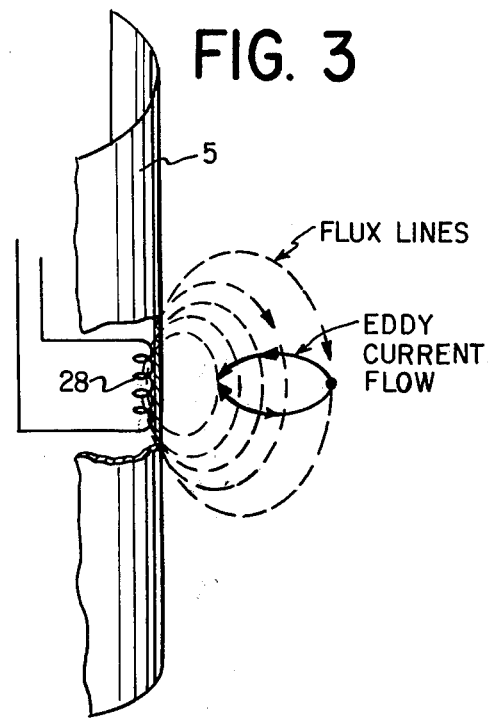
FIG. 3 is a diagrammatic representation of lines of flux created when the coils shown in FIGS. 1 and 2 are energized, the eddy current associated therewith.

In operation, each energized coil 28, 28A and 28B causes lines of flux to enter the earth formation. Eddy currents develop around the lines of flux from an energized coil as shown in FIG. 3 to cancel the field. A change in the earth formation from type to another type causes the eddy currents to change. That is, as the resistivity, dielectric constant and magnetic permeability changes from one type of earth formation to another type, these changes cause the eddy currents to change. The eddy current in turn causes the grid current to the grid 38 of tube 30 to change. Thus as eddy currents increases, the grid current in a corresponding oscillator increases.

Referring again to FIG. 2, a small portion of the grid current passed through a current limiting resistor 70 and is provided uphole where it is amplified and recorded by amplifier 80 and recording means 83.

Figure 4:
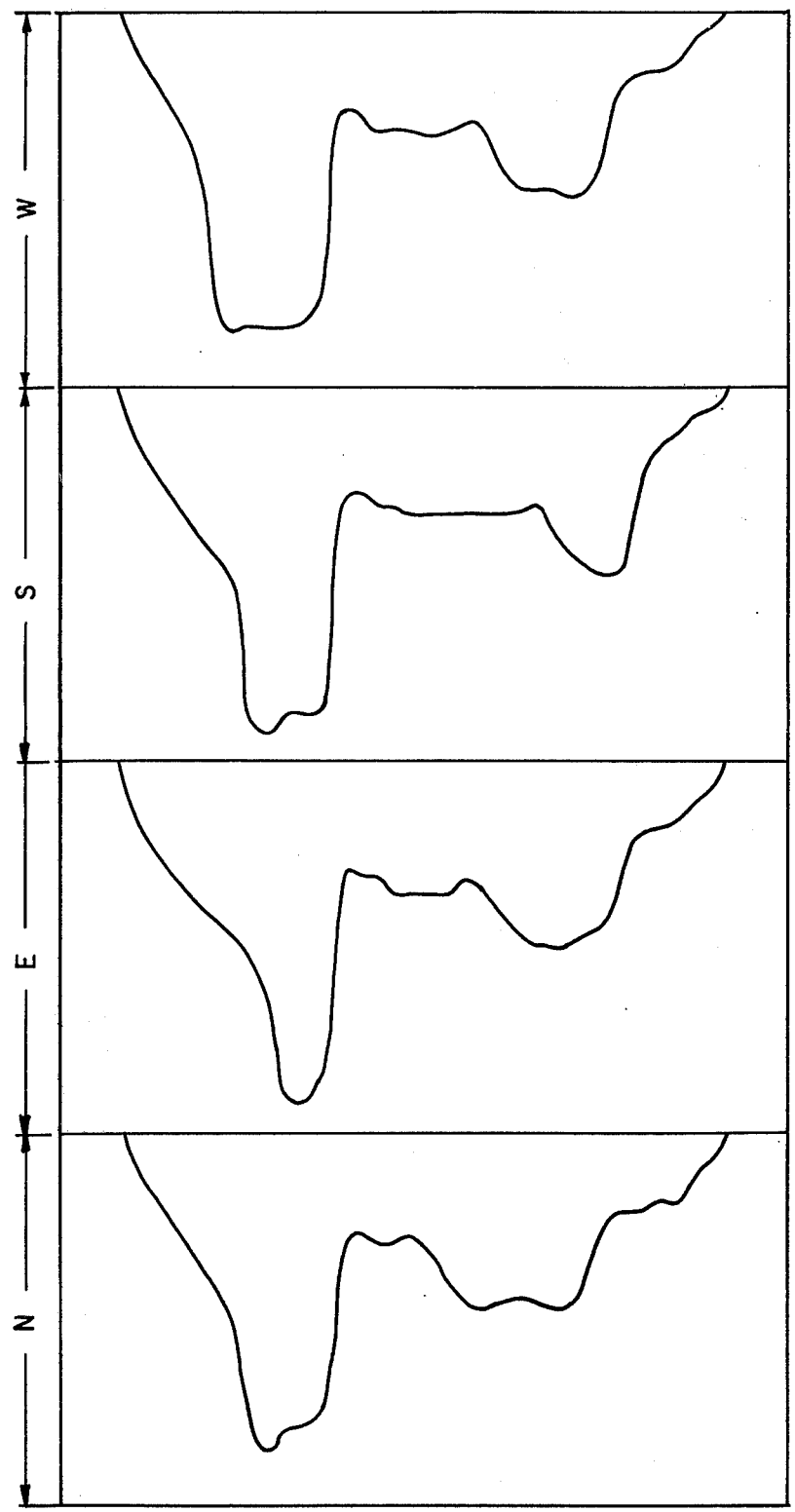

FIG. 4 shows a portion of a recording from a single coil dipmeter embodying the novel concept of the present invention, and run four times at different 90° azimuth orientations. FIG. 4 shows the type of recording that is obtainable from the present invention.

It would be obvious to one skilled in the art that the three coil dipmeter shown in FIG. 1 may be improved upon by the addition of another oscillator with coil, and the four coils rearranged for proper spacing, to improve the accuracy of the dipmeter.

One advantage may accrue when the oscillators are operated at different frequencies. This advantage is that any potential interference between coils may be eliminated or reduced.

It would be also obvious to one skilled in the art to use two separate coils in each pad. One coil transmits while the other coil receives.

The important point is the range of frequency used. Although operation is satisfactory over a minimum frequency of 100 kilohertz, a preferred range lies within 50 megahertz and 200 megahertz.

The device of the present invention as heretofore described is a dipmeter which causes eddy currents to flow in an earth formation. The dipmeter senses and records changes in the eddy currents. The changes in the eddy currents are related to a change in the type of earth formation and may be used to determine the location of an interface between different types of earth formations.

What is claimed is:

1. A dipmeter comprising a logging tool adapted to be passed through a borehole traversing an earth formation which includes means for sensing an angle of inclination of the borehole and providing an inclination signal corresponding thereto, means for sensing an azimuth angle for the logging tool and providing a corresponding azimuth signal, means for sensing the diameter of the borehole and providing a signal corresponding thereto, and at least three circuit means for generating lines of flux and eddy currents in the earth formation, said circuit means being in a predetermined spatial relationship to each other, and each circuit means includes a radio frequency oscillator comprising a coil urged in substantially close proximity to the side of the borehole, means connected to the coil for providing an alternating current, having a frequency within a preferred range of frequencies of 50 to 200 megahertz, to the coil so as to energize the coil, thereby creating lines of flux and eddy currents, said alternating current means includes a vacuum tube having a grid current corresponding to the alternating current in the coil, and means connected to the vacuum tube for providing a dip signal corresponding to said lines of flux and eddy currents in accordance with the grid current; surface apparatus comprising means for providing a signal corresponding to the depth of the logging tool in the borehole, and means for recording signals; and transmission means connecting the recording means to the sensing means and to all the dip signal means for providing the signals from the sensing means and the dip signal means to the recording means so that the signals are recorded by the recording means.

* * * * *